US008224868B2

(12) United States Patent
Conway

(10) Patent No.: US 8,224,868 B2
(45) Date of Patent: Jul. 17, 2012

(54) NETWORK CODING WITH LAST MODIFIED DATES FOR P2P WEB CACHING

(75) Inventor: Adrian E. Conway, Weston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 589 days.

(21) Appl. No.: 12/183,559

(22) Filed: Jul. 31, 2008

(65) Prior Publication Data

US 2010/0030787 A1 Feb. 4, 2010

(51) Int. Cl.
*G06F 17/30* (2006.01)
(52) U.S. Cl. ........................................................ 707/803
(58) Field of Classification Search .................. 707/802, 707/803, 804, 640, 641
See application file for complete search history.

(56) References Cited

U.S. PATENT DOCUMENTS

| | | | | |
|---|---|---|---|---|
| 6,754,273 B1 * | 6/2004 | Sackstein et al. | ........ | 375/240.21 |
| 7,706,365 B2 * | 4/2010 | Effros et al. | .................. | 370/389 |
| 7,756,051 B2 * | 7/2010 | Rodriguez et al. | ............ | 370/252 |
| 2004/0215810 A1 * | 10/2004 | Tan et al. | ....................... | 709/232 |
| 2007/0239806 A1 * | 10/2007 | Glover | ........................... | 707/204 |
| 2009/0177948 A1 * | 7/2009 | Fischer et al. | ................ | 714/776 |

OTHER PUBLICATIONS

Gkantsidis et al., "Network Coding for Large Scale Content Distribution," INFOCOM 2005, 24th Annual Joint Conference of the IEEE Computer and Communications Societies, vol. 4, Mar. 13-17, 2005, pp. 2235-2245.

Chou et al., "Network Coding for the Internet and Wireless Networks," IEEE Signal Processing Magazine, vol. 24, Issue 5, Sep. 2007, pp. 77-85.

Ho et al., "A Random Linear Network Coding Approach to Multicast," IEEE Transactions on Information Theory, vol. 52, Issue 10, Oct. 2006, pp. 4413-4430.

* cited by examiner

*Primary Examiner* — Angela Lie

(57) ABSTRACT

A method may include obtaining a source file at a node in peer-to-peer network and dividing the source file into a plurality of pieces. The pieces of the source file may be encoded using network coding principles. A last-modified-date (LMD) value may be appended to each of the encoded pieces, the LMD value being the same for each of the encoded pieces of the source file. The encoded pieces with the LMD values may be sent to one or more other nodes in the peer-to-peer network.

10 Claims, 9 Drawing Sheets

NETWORK CODING WITH LAST MODIFIED DATES FOR P2P WEB CACHING

BACKGROUND

Network coding may provide an efficient distribution mechanism in peer-to-peer (P2P) network systems. Network coding relies on the linear randomization of data blocks at network nodes. These linearly randomized data blocks (encoded blocks) may be used to provide more than one set of data, depending on the data a node already has. In this manner, a node may require receiving a certain number of linearly independent data blocks before solving a set of linear equations that will produce the original data. Network coding may prevent dependency on any one piece of data, and may increase network usage efficiency. Web caching may typically involve a hierarchy of proxy servers that store web content. A web caching system may also be implemented as a P2P system or as a network coding system.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and their equivalents.

Implementations described herein ensure current information is assembled when using network coding and file transfers among different nodes in a network. In one implementation, a file transfer may take place from one web cache to another. This file transfer may use network coding, and may involve a peer-to-peer (P2P) network. In another implementation, a file transfer may take place from one personal computer to another.

File content in a network coding system may be updated or replaced. For example, web cache replacement algorithms are often used to replace cached web content. Updating file content at a source node may result in encoded pieces associated with newer file content. When file content is updated or replaced at a source node, one or more other nodes in a network may have outdated (or stale) encoded file pieces. These other nodes may attempt to transfer outdated encoded file pieces. It is beneficial for a recipient node to be able to determine if a sending node's encoded file pieces are out-of-date, so that the recipient node may choose whether to accept the encoded pieces, to reject the encoded pieces, to ignore the sending node, etc. For example, if the recipient node does not recognize that encoded pieces are out-of-date, it may attempt to combine the stale encoded pieces with current pieces, which may result in defective or out-of-date file content. Inclusion of a last-modified-date (LMD) field with the encoded pieces of a source file may be used verify the currency of encoded pieces in a P2P environment.

Figure 1:
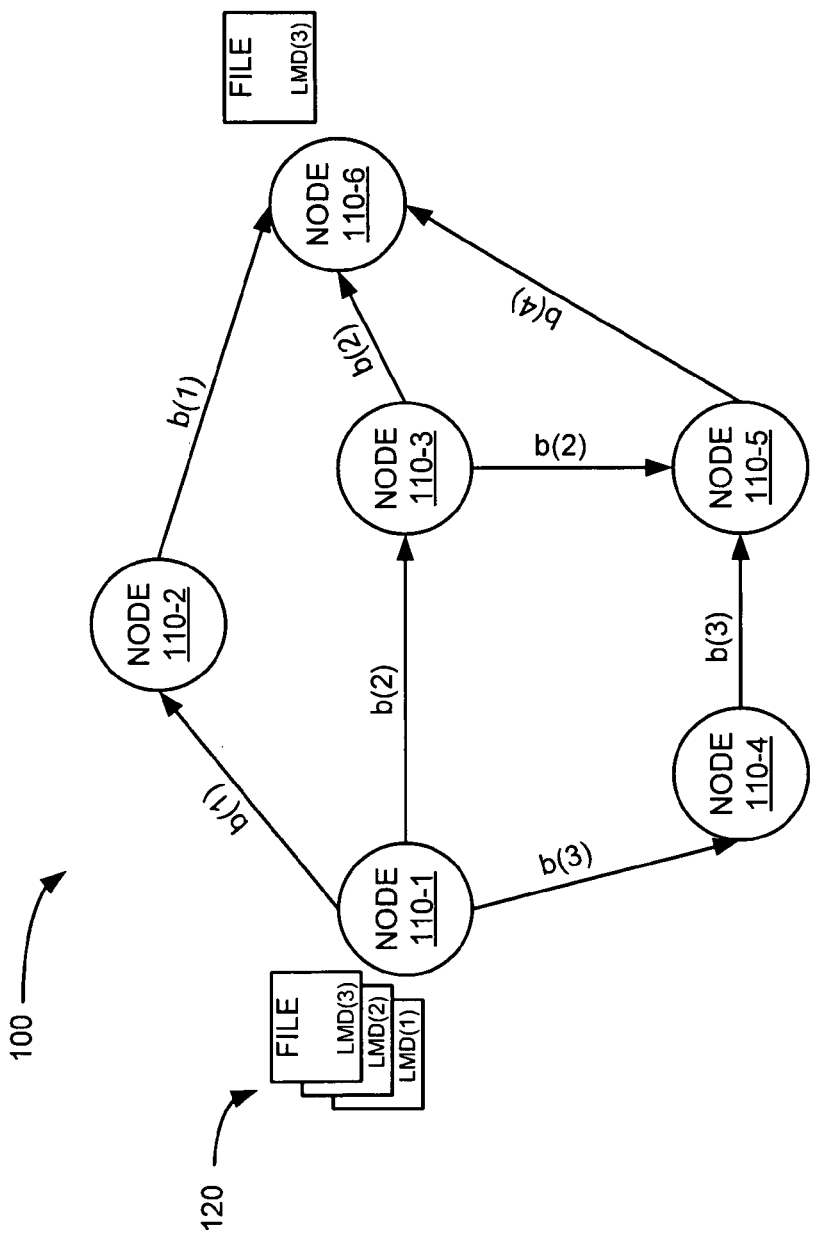
FIG. 1 is schematic diagram illustrating an implementation of the systems and methods described herein.

The concept of applying a LMD field to network coding in a file sharing system is shown in FIG. 1. P2P network 100 may include nodes 110-1, 110-2, 110-3, 110-4, 110-5, and 110-6 (collectively referred to herein as "nodes 110," and generically referred to herein as "node 110-x"). Node 110-x may be a server, a personal computer, a laptop, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a radiotelephone, or another type of computation or communication device.

In the example of FIG. 1, node 110-1 may be a source node and node 110-6 may be a recipient node for information, such as file 120, being sent over P2P network 100. Nodes 110-2, 110-3, 110-4 and 110-5 may be intermediate nodes (or network coding nodes) that may store pieces of information from source node 110-1 and transmit information to recipient node 110-6 upon request. The arrangement of FIG. 1 is exemplary. In other implementations of P2P network 100, any of nodes 110 may serve as a source node, intermediate node and/or recipient node.

As shown in FIG. 1, file 120 generated at source node 110-1 may be updated one or more times. Each update to the file may include a last-modified-date (i.e., "LMD(1)," "LMD(2)," "LMD(3)," etc.). Each time the file is updated, the file may be divided into multiple pieces to be distributed over P2P network 100 using network coding techniques. As used herein, "network coding" may be considered a theory of switching/routing in which computations are done on pieces at network nodes.

In a P2P file downloading or P2P file sharing system based on network coding, such as exemplary P2P network 100, the source file (e.g., file 120), may first be divided into a number of pieces, which are then encoded. While a last-modified-date or other currency indicator may be applied to file 120 when it is updated, the indicator may no longer be directly available after the indicator becomes embedded in the encoded pieces. File 120 may be divided into any number of pieces, and three encoded pieces (i.e., b(1), b(2) and b(3)) are used if FIG. 1 for simplicity. In one implementation, source node 110-1 may treat the individual bytes in the piece as a vector to create the encoded pieces. In other implementations, source node 110-1 may linearly encode the information in each piece in any manner that is consistent with producing a new piece containing information that is a linear combination of information stored within the original piece.

As illustrated in FIG. 1, various linear combinations of pieces of file 120 are formed at source node 110-1 and at other nodes (e.g., nodes 110-2, 110-3, 110-4, 110-5 and/or 110-6) in P2P network 100. Thus, for example, node 110-5 may derive a unique linear combination of pieces (e.g., encoded piece b(4) of FIG. 1) from other encoded pieces received indirectly from source node 110-1. Encoded pieces may be stored in a web cache at multiple nodes (e.g., nodes 110-2, 110-3, 110-4, and 110-5) throughout P2P network 100 to form a P2P web caching network system. Each time file 120 is updated at source node 110-1, a new set of encoded pieces may be distributed throughout network 100.

Content stored at intermediate nodes 110-2, 110-3, 110-4, and 110-5 can become stale when file 120 (which may be, for example, an HTML page or another file) is modified or updated at source node 110-1 and the updated encoded pieces are not received at the other nodes. For example, if any of the intermediate nodes 110-2, 110-3, 110-4, and 110-5 in P2P network 100 intermittently disconnects from network 100, these nodes may be unavailable to receive updates from source node 110-1.

To ensure that encoded pieces of the current version of file 120 (LMD(3)) are retrieved by recipient node 110-6 from intermediate nodes 110-2, 110-3 and 110-5, source node 110-1 may include a LMD value with each encoded piece distributed from source node 110-1. The LMD value for each encoded piece associated with a particular file version will be the same. The LMD value may take on various forms, such as Greenwich Mean Time (GMT) or Coordinated Universal Time (UCT). The LMD value may be determined using, for example, a protocol such as Network Time Protocol (NTP) or Simple Network Time Protocol (SNTP). Methods and systems disclosed herein describe implementations of a LMD field for encoded pieces as used by source node 110-1; intermediate nodes 110-2, 110-3, 110-4, and 110-5; and/or recipient node 110-6 in P2P network 100.

Figure 2:
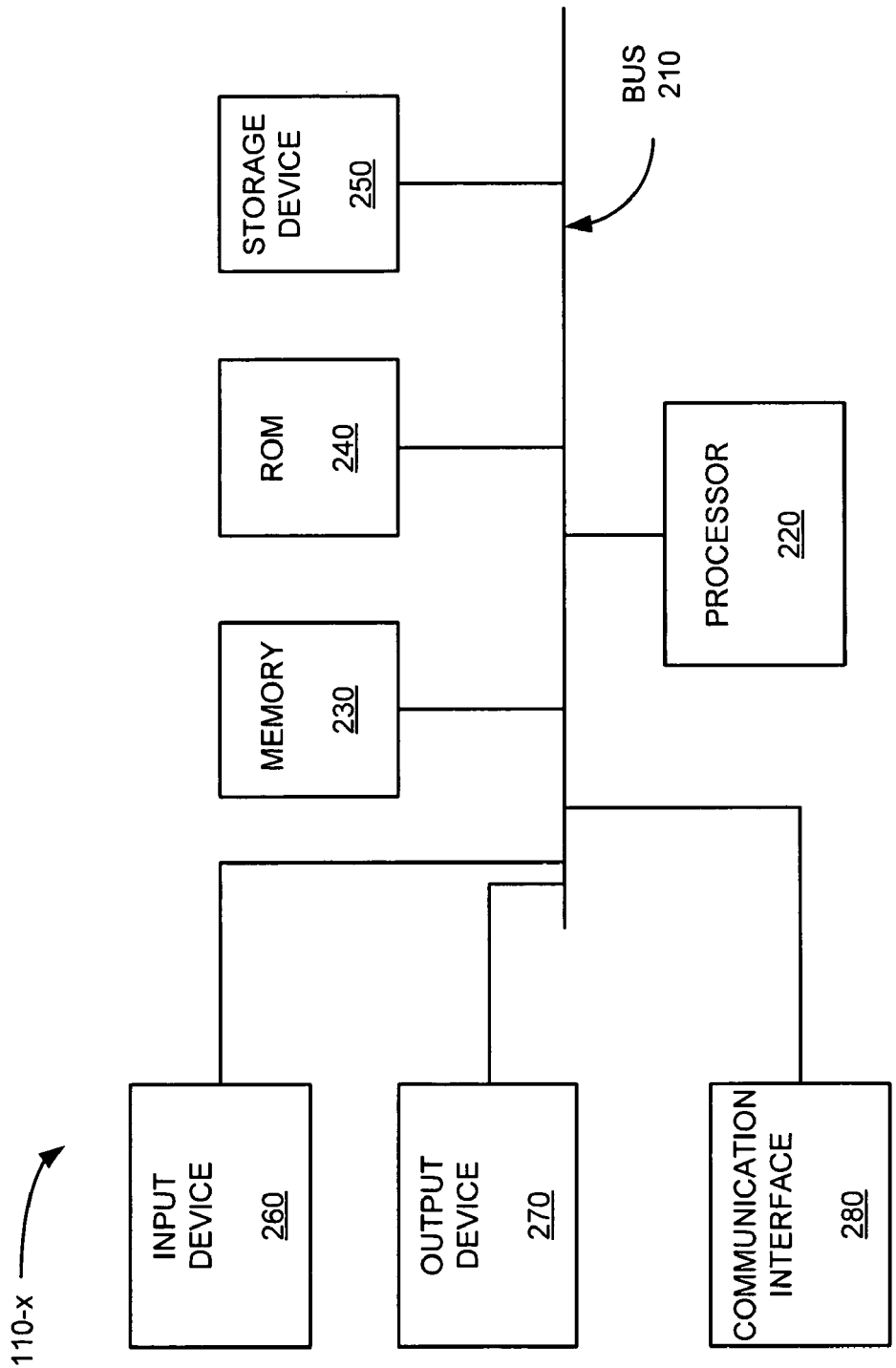
FIG. 2 is a diagram of an exemplary network device in which systems and methods described herein may be implemented.

FIG. 2 is a block diagram of exemplary components of node 110-x. As illustrated, node 110-x may include a bus 210, a processor 220, a main memory 230, a read only memory (ROM) 240, a storage device 250, an input device 260, an output device 270, and a communication interface 280. Bus 210 may include conductors or a pathway that permit communication among the components of node 110-x.

Processor 220 may include a processor(s), a microprocessor(s), or processing logic that may interpret and execute instructions. Memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include one or more mechanisms that permit a user to input information to node 110-x, such as a keyboard, a touch screen, a touch pad, a mouse, a pen, voice recognition and/or biometric mechanisms, etc. Output device 270 may include one or more mechanisms that output information to the user, including a display, a printer, a speaker, etc. Communication interface 280 may include any transceiver-like mechanism that enables node 110-x to communicate with other devices and/or systems. For example, communication interface 280 may include mechanisms for communicating with another node or system within a network, such as network 100.

Although FIG. 2 shows exemplary components of node 110-x, in other implementations, node 110-x may contain fewer or additional components that may compliment and enable network coding for P2P web caching. In still other implementations, one or more components of node 110-x may perform the tasks performed by other components of node 110-x.

Figure 3:
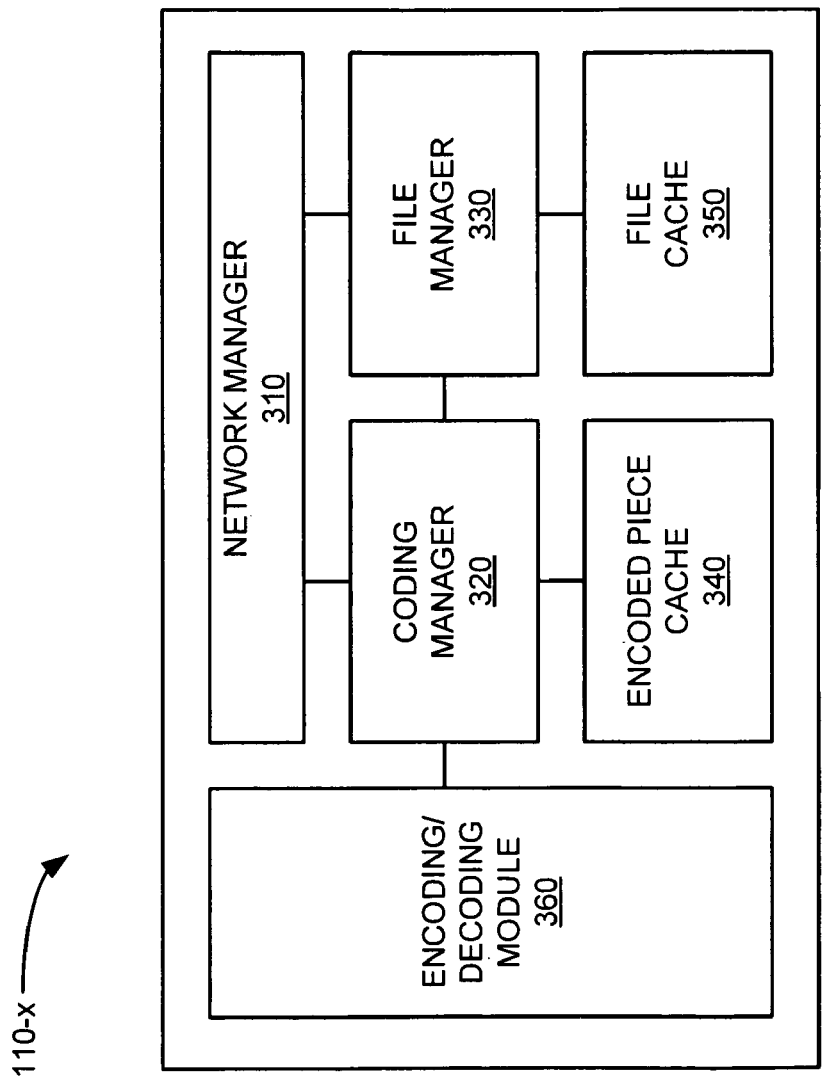
FIG. 3 is a functional block diagram of the exemplary network device of FIG. 2.

FIG. 3 is a diagram of exemplary functional elements of node 110-x. Node 110-x may include network manager 310, coding manager 320, file manager 330, encoded piece cache 340, file cache 350, and encoding/decoding module 360. The exemplary functional arrangement of FIG. 3 may include elements for node 110-x to function as a source node, an intermediate node, and/or a recipient node. In other implementations, node 110-x may include additional or few elements.

Network manager 310 may enable node 110-x to communicate with other nodes, servers, devices, or the like in P2P network 100. Network manager 310 may send and receive packets or pieces of information, send and/or receive requests to perform an operation, and/or send and receive other information used by node 110-x to participate in P2P network 100. In one implementation, network manager 310 may also verify the legitimacy or authenticity of encoded pieces. Additionally, network manager 310 may communicate with coding manager 320 and file manager 330. Network manager 310 may transmit encoded pieces, information with respect to pieces stored elsewhere on the network, and/or information that coding manager 320 may require for node 110-x to participate in P2P network 100.

Coding manager 320 may include processing logic to perform network coding management functions for node 110-x. In one implementation, coding manager 320 may receive from network manager 310 the number and/or size of encoded pieces that an original source file was divided into by the source node. Coding manager 320 may also receive encoded pieces from network manager 310. Coding manager 320 may further pass received pieces to encoded piece cache 340 and transfer pieces that are stored within encoded piece cache 340 to network manager 310 and/or file manager 330. Coding manager 320 may also delete stored pieces if it is determined, for example, that a piece is stale, that a piece has not been received in its entirety, that a piece contains an error, or that a piece is corrupted.

Coding manager 320 may also determine when the number of encoded pieces necessary to decode the pieces and recover the original source file has been received. Coding manager 320 may compare a LMD field of each of the encoded pieces to determine if the LMD field is the same for each encoded piece. Upon making this determination, coding manager 320 may communicate with encoding/decoding module 360 to decode the encoded pieces and then transfer each decoded piece to file manager 330.

In another implementation, coding manager 320 may also send pieces through network manager 310 to another node. Coding manager 320 may receive encoded pieces and may communicate with encoding/decoding module 360 to combine encoded pieces from a common source file that have a common LMD value.

In another implementation, coding manager 320 may receive unencoded pieces from a common source file and may communicate with encoding/decoding module 360 to encode the pieces. Coding manager 320 may append a common LMD value to each encoded piece associated with a common source file.

File manager 330 may include processing logic to manage, assemble and divide files for node 110-x. In one implementation, file manager 330 may receive the decoded pieces from coding manager 320 and combine the decoded pieces to create a copy of the original source file sent by a source node (e.g., source node 110-1 of FIG. 1). Once file manager 330 has combined the decoded pieces to create a copy of the original source file, file manager 330 may pass the copy of the original source file to file cache 350. File manager 330 may communicate with an operating system, a web browser, or another application running on node 110-x to provide the copy of the original source file to the requested application.

In another implementation, file manager 330 may receive a source file from content network manager 310 or another application within node 100-*x*. File manager 330 may divide the source file into unencoded pieces and send the unencoded pieces to coding manager 320.

Encoded piece cache 340 may include processing logic to perform storage functions of encoded pieces for node 110-*x*. In one implementation, encoded piece cache 340 may store encoded pieces until coding manager 320 determines that particular encoded pieces may be combined, that particular pieces may be sent to another node, or that there are sufficient pieces to assemble a copy of the original source file. Encoded piece cache 340 may also include a storage device (e.g., storage device 250) that includes a hard drive or another physical storage medium capable of storing the encoded pieces.

File cache 350 may include processing logic to perform unencoded file storage functions for node 110-*x*. File cache 350 may store copies of files assembled by file manager 330. File cache 350 may include a storage device (e.g., storage device 250) that includes a hard drive or another physical storage medium capable of storing the copy of the original source file.

Encoding/decoding module 360 may include processing logic to perform encoding and decoding functions for node 110-*x*. Encoding/decoding module 360 may encode pieces and decode encoded pieces of source files received from coding manager 320. For encoding, encoding/decoding module 360 may regard each piece as a symbol in a finite field. Encoding/decoding module 360 may construct linear combinations of the symbols to form encoded pieces. Each encoded piece may have an associated encoding vector composed of the coefficients that were used for the particular linear combination. The encoding vector may be included in, for example, a header of each corresponding piece. Encoding/decoding module 360 may form the linear combinations using randomly generated coefficients. This can help ensure that the encoded pieces are linearly independent with a high probability. For decoding, encoding/decoding module 360 may be provided (by, e.g., coding manager 320) a sufficient number of linearly independent encoded pieces so as to be able to derive computationally the original source file pieces (symbols) by solving a set of simultaneous linear equations.

In another implementation, encoding/decoding module 360 may also combine encoded pieces from a common source file that have been determined to have a common LMD value. Encoding/decoding module 360 may receive encoded pieces from coding manager 320, along with their associated encoding vectors. Encoding/decoding module 360 may, in turn, form new (random) linear combinations of the encoded pieces that encoding/decoding module 360 received.

Figure 4:
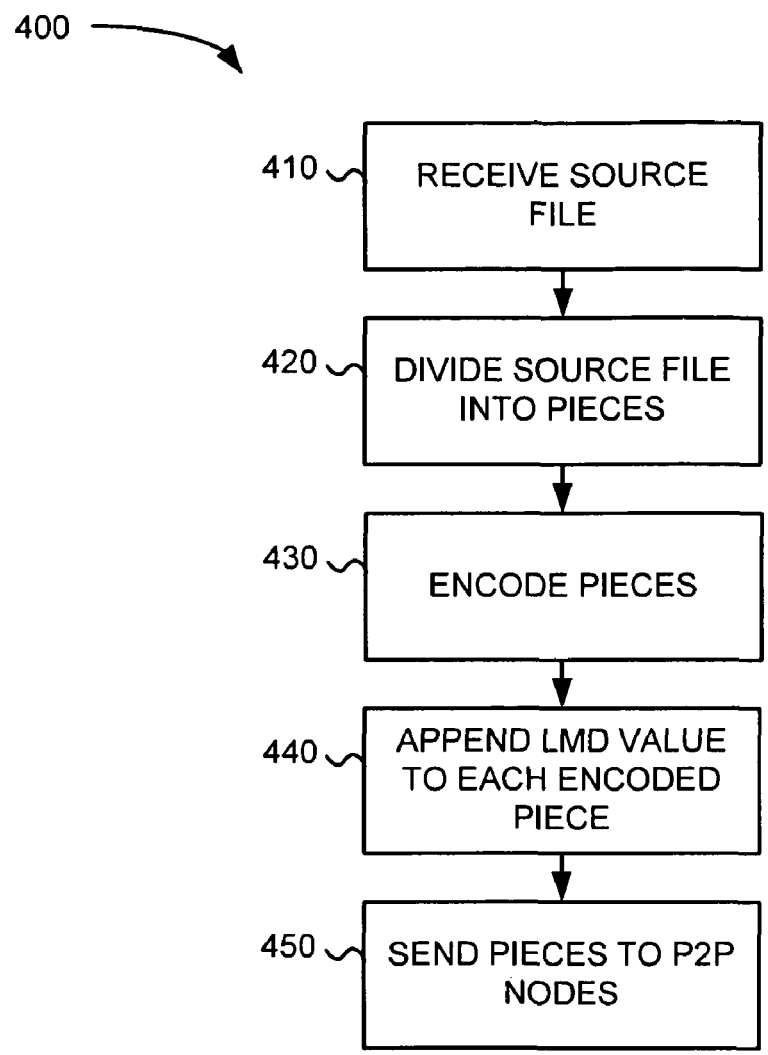
FIG. 4 is a flow chart of an exemplary process for sending a source file with last modified date (LMD) information and network coding in a peer-to-peer (P2P) network.

FIG. 4 provides a flow chart 400 of an exemplary process for sending encoded pieces of a source file with LMD information in a P2P network. The process may be performed, for example, by a computing device, such as source node 110-1 in P2P network 100, when source file content is provided and/or updated.

A source file may be received (block 410). For example, source node 110-1 may receive a new file or receive updated information for an existing file. The new file or updated information may be provided from another source or be input by a user of a computing device at source node 110-1.

The source file may be divided into pieces (block 420). For example, source node 110-1 (using, e.g., file manager 330 of FIG. 3) may divide the source file into pieces suitable for dissemination in a network coding environment.

The pieces may be encoded (block 430). For example, source node 110-1 (using, e.g., encoding/decoding module 360 of FIG. 3) may encode each piece to include an encoding vector.

A LMD value may be appended to each encoded piece (block 440). For example, source node 110-1 (using, e.g., coding manager 320 of FIG. 3) may append a LMD value to each of the encoded pieces associated with the source file. The LMD value is the same for each of the encoded pieces associated with the source file. The LMD value may be appended to, for example, the corresponding encoding vector for each encoded piece.

The encoded pieces may be sent over a P2P network (block 450). For example, source node 110-1 (using, e.g., network manager 320 of FIG. 3 and communication interface 280 of FIG. 2) may send the encoded pieces to a variety of intermediate nodes or recipient nodes in a P2P network. When each encoded piece is sent from source node 110-1 to another node, the LMD information can travel along with the encoded piece.

Figure 5:
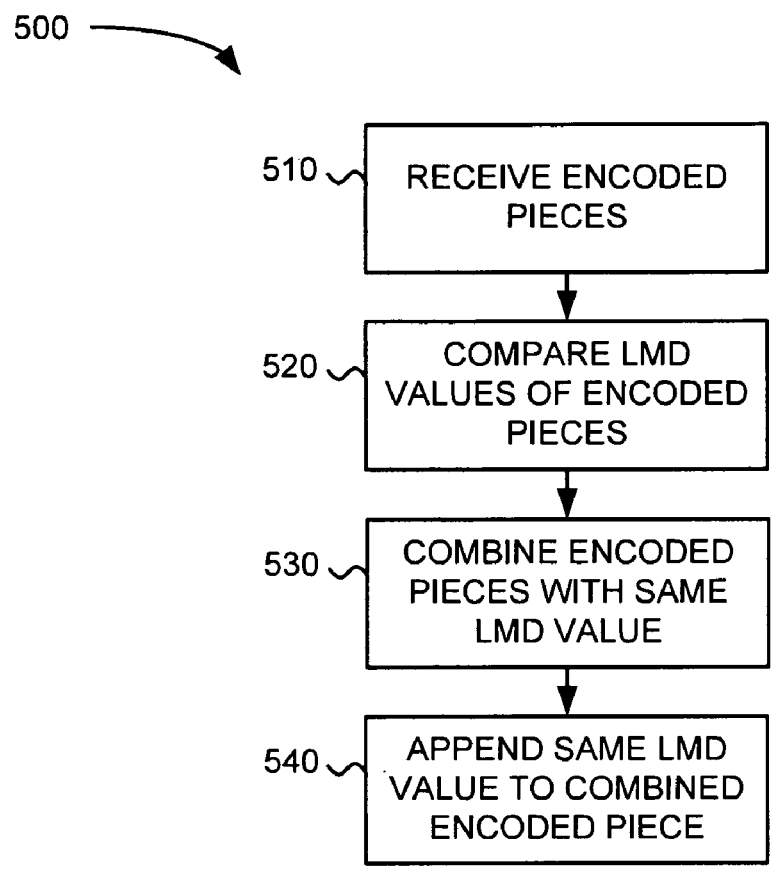
FIG. 5 is a flow chart of an exemplary process for updating encoded pieces of a source file using LMD information with network coding in a P2P network.

FIG. 5 provides a flow chart 500 of an exemplary process for updating cached encoded pieces of a source file using LMD information with network coding in a P2P network. The process may be performed, for example, by a computing device, such as intermediate node 110-5 in P2P network 100, when updated content is sent from a source node.

Encoded pieces may be received (block 510). For example, intermediate node 110-5 may receive encoded pieces of the same source file from a source node 110-1. When pieces from the same source file are received, the intermediate node may attempt to (randomly) combine two or more encoded pieces of the same source file to form a new encoded piece.

LMD values of the randomly selected encoded pieces may be compared (block 520). For example, intermediate node 110-5 (using, e.g., coding manager 320 of FIG. 3) may compare the LMD values of the two or more encoded pieces that were randomly selected for combining. Encoded pieces without the same LMD value may not be combined.

Encoded pieces with the same LMD value may be combined (block 530). For example, assuming the randomly selected encoded pieces were determined to have the same LDM value, intermediate node 110-5 (using, e.g., encoding/decoding module 360 of FIG. 3) may combine the pieces by, for example, including additional random coefficients using network coding techniques.

The same LMD value may be appended to the combined encoded piece (block 540). For example, intermediate node 110-5 (using, e.g., coding manager 320 of FIG. 3) may append an LMD value to the combined encoded piece. The LMD value will be the same as the LMD value used for the individual pieces before the pieces were combined. The combined encoded piece with the LMD value may be sent to another node within P2P network 100 or stored at the intermediate node (in, e.g., encoded piece cache 340) until requested or updated.

Figure 6:
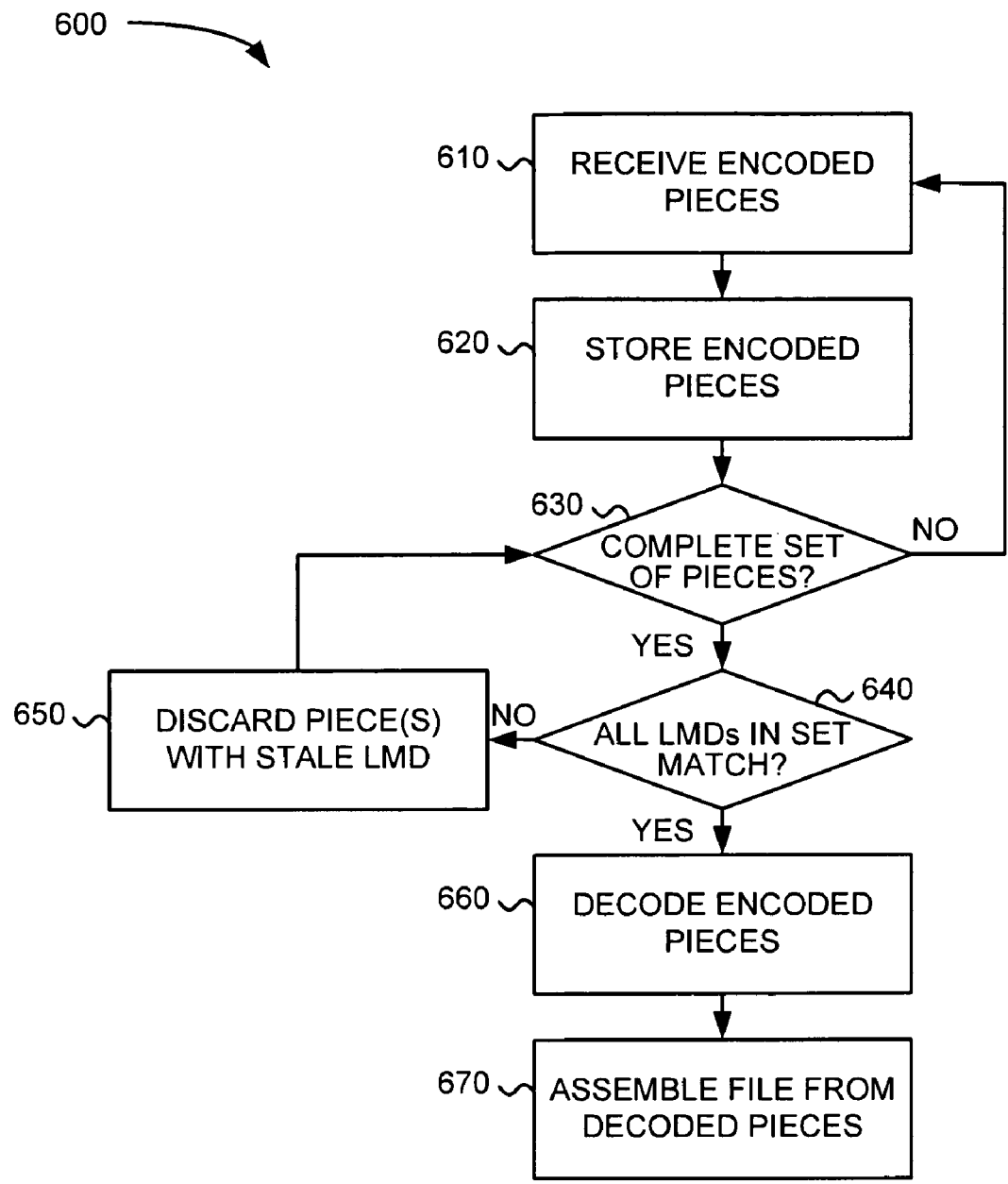
FIG. 6 is a flow chart of an exemplary process for using LMD information to receive a source file with network coding in a P2P network.

FIG. 6 provides a flow chart 600 of an exemplary process for using LMD information to receive a source file with network coding in a P2P network. The process may be performed, for example, by a computing device, such as recipient node 110-6 in P2P network 100, when content is requested. For example, a user of a computing device at node 110-6 may request information through a web browser or another application.

Encoded pieces may be received (block 610). For example, in response to a request for a file, recipient node 110-6 may receive, from other nodes in P2P network 100, coding information relevant to the requested file. The coding information may include, for example, an encoded piece of the requested file and/or an encoding vector.

The encoded pieces may be stored (block 620). For example, recipient node 110-6 may store the coding information in a memory, such as encoded piece cache 340 of FIG. 3.

It may be determined if the received encoded pieces form a complete set (block 630). For example, recipient node 110-6 (using, e.g., coding manager 320 of FIG. 3) may evaluate the received encoded piece with other encoded pieces (if any) that may be stored at recipient node 110-6 (e.g., in encoded piece cache 340). Recipient node 110-6 may collects pieces until it receives at least the same number of pieces as were sent from source node 110-1. The number of pieces, which may be denoted as "K," may be included, for example, in the header for each piece along with the encoding vector. Once recipient node 110-6 has received K pieces with linearly-independent encoding vectors, the set may be considered complete. If it is determined that the encoded pieces do not form a complete set for the requested file, the process may return to block 610 to receive additional coding information. If it is determined that the encoded pieces do form a complete set for the requested file, the process may proceed to block 640.

It may be determined if the LMDs from the complete set match (block 640). For example, recipient node 110-6 (again using, e.g., coding manager 320) may evaluate the LMD appended to each encoded piece forming the complete set for the requested file to determine if all the LMDs are the same. If it is determined that the LMDs do not match, the encoded pieces with stale LMDs may be discarded (block 650). For example, recipient node 110-6 may identify the most recent LMD among the encoded pieces. Any encoded pieces with a less recent LMD than the most recent LMD may be deemed stale and discarded. After discarding any pieces, the process may return to block 630 to consider if the discarding of the stale encoded pieces alters the completion status of the set for the requested file.

If it is determined that all the LMDs match, the encoded pieces may be decoded (block 660). For example, recipient node 110-6 (again using, e.g., coding manager 320) may decode each of the encoded pieces that are part of the completed set for the requested file. Recipient node 110-6 may, for example, decode the encoded pieces by applying Gaussian elimination (or another an algorithm for solving systems of linear equations) to the encoding vectors taken from the header of each piece in the complete set.

The file may be assembled from the decoded pieces (block 670). For example, recipient node 110-6 (using, e.g., file manager 330 of FIG. 3) may combine the decoded pieces to create a copy of the original source file sent by the source node.

Figure 7A:
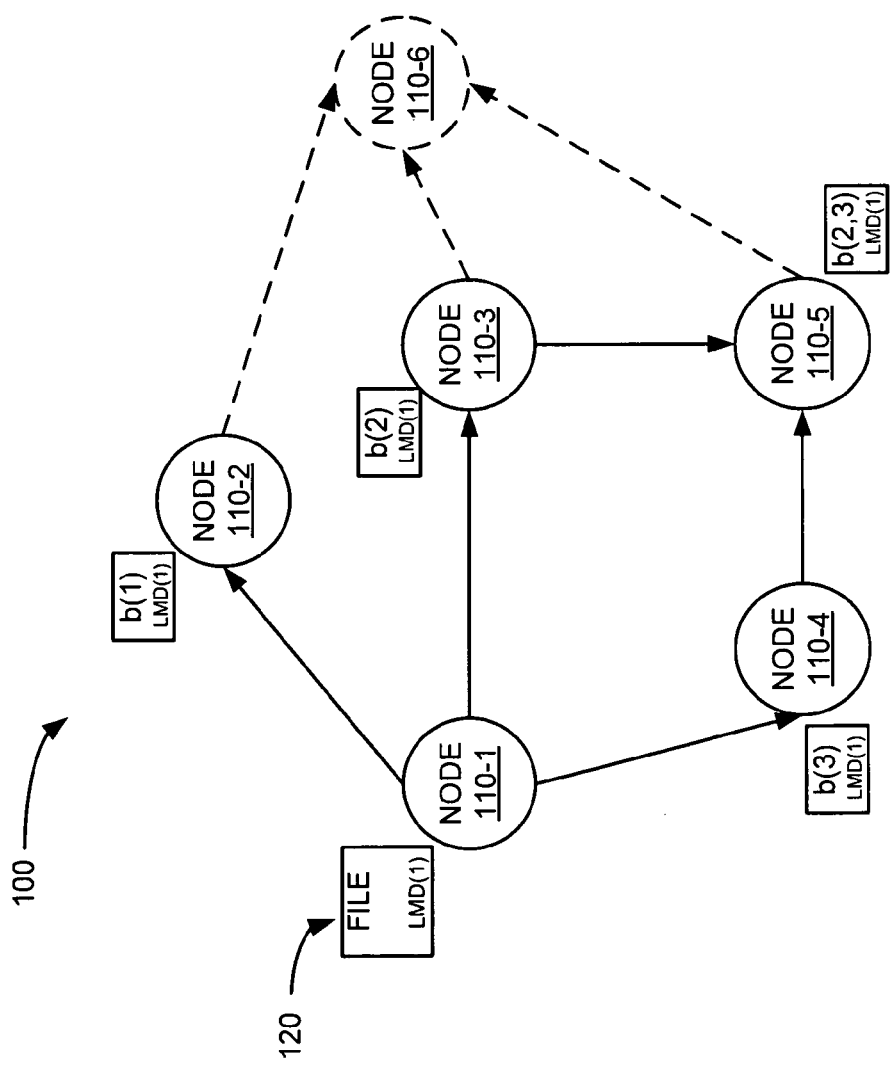
FIGS. 7A-7C are diagrams for using network coding with LMD information in a P2P network.
Figure 7B:
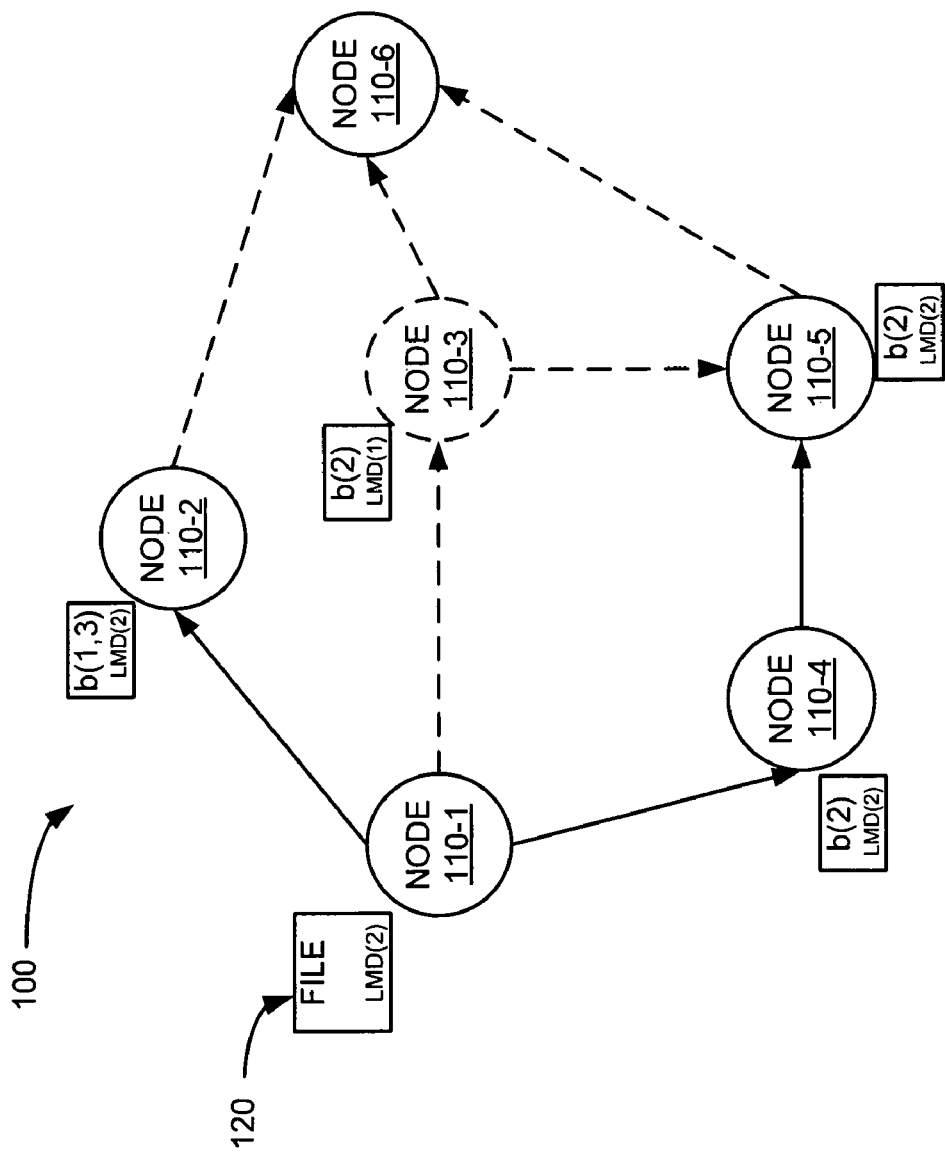
Figure 7C:
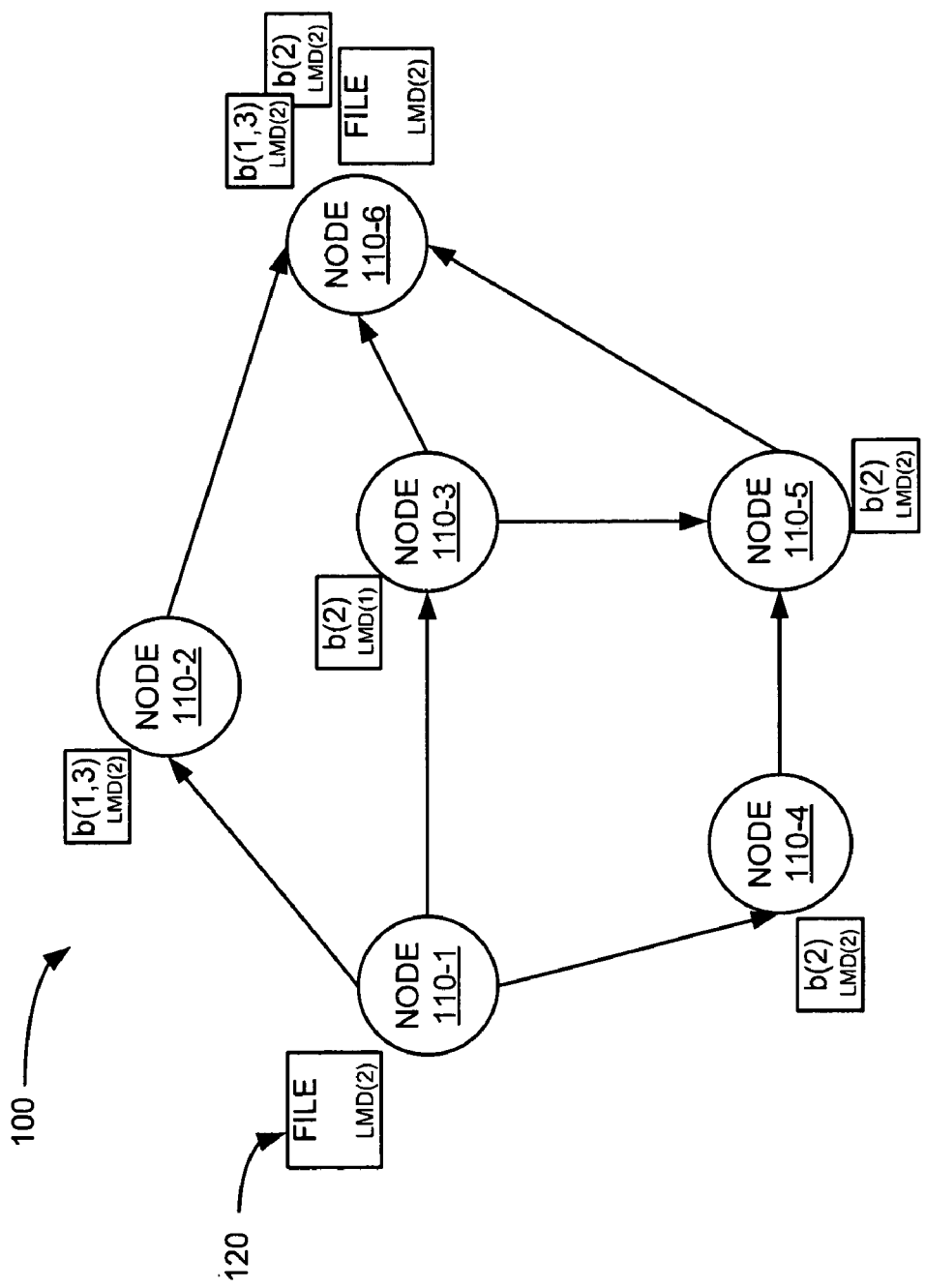

FIGS. 7A-7C are diagrams for using network coding with LMD information in a P2P network. The example of FIGS. 7A-C uses exemplary P2P network 100 described in FIG. 1.

FIG. 7A shows an exemplary distribution of encoded pieces b(1), b(2), and b(3) of a first version ("LMD(1)") of file 120. Encoded pieces b(1), b(2), and b(3) may be sent from source node 110-1 in a randomly selected distribution. Encoded piece b(1) is forwarded to node 110-2. Encoded piece b(2) is forwarded to node 110-3. Encoded piece b(3) is forwarded to node 110-4. Encoded piece b(2) is also forwarded from node 110-3 to node 110-5. Encoded piece b(3) is also forwarded from node 110-4 to node 110-5, where node 110-5 may combine piece b(2) and piece b(3) to form a new encoded piece b(2,3) with a new encoding vector. Each of encoded pieces b(1), b(2), b(3), and b(2,3) may include a common LMD value ("LMD(1)") appended to the encoded piece. At the time of the distribution of the encoded pieces in FIG. 7A, node 110-6 is not participating in P2P network 100 and, thus, does not receive any encoded pieces of file 120 version LMD(1).

FIG. 7B shows an exemplary distribution of encoded pieces b(1), b(2), and b(3) of a second version ("LMD(2)") of file 120. Encoded pieces b(1), b(2), and b(3) may again be sent from source node 110-1 in a randomly selected distribution. Encoded pieces b(1) and b(2) are forwarded to node 110-2. Encoded piece b(2) is forwarded to node 110-4. Encoded piece b(2) is also forwarded from node 110-4 to node 110-5. At the time of the distribution of the encoded pieces in FIG. 7B, nodes 110-3 and 110-6 are not participating in P2P network 100 and, thus, do not receive any encoded pieces of file 120 version LMD(2).

Upon receipt of the LMD(2) version of encoded pieces b(1) and b(3), node 110-2 may discard the LMD(1) version of encoded piece b(1) that was provided in FIG. 7A. Node 110-2 may also combine the LMD(2) versions of piece b(1) and piece b(3) to form a new encoded piece b(1,3) with a new encoding vector. Upon receipt of the LMD(2) version of encoded piece b(2), node 110-4 may remove the LMD(1) version of encoded piece b(3) that was provided in FIG. 7A. Also upon receipt of the LMD(2) version of encoded piece b(2), node 110-5 may discard the LMD(1) version of encoded piece b(2,3) that was assembled in FIG. 7A.

FIG. 7C shows an exemplary file request by recipient node 110-6 at some point after distribution of the second version ("LMD(2)") of file 120 in FIG. 7B. At some later point in time, recipient node 110-6 may request file 120. In order for node 110-6 to derive computationally the original source file 120, it suffices for node 110-6 to obtain from its neighboring nodes (e.g., nodes 110-2, 110-3, and 110-5) a sufficient number of encoded pieces (and associated encoding vectors) to be able to construct a system of simultaneous linear equations that may then be solved numerically for a vector representing the original source file. Node 110-6 may then directly construct the original source file from the solved pieces vector.

Based on a request from node 110-6, node 110-2 may provide the LMD(2) version of encoded piece b(1,3), node 110-5 may provide the LMD(2) version of encoded piece b(2), and node 110-3 may provide the LMD(1) version of encoded piece b(2). The LMD(1) version of encoded piece b(2) from node 110-3 may be rejected based on the LMD value of that encoded piece. Thus, use of the LMD values in each encoded piece may be used to ensure that the encoded pieces used to construct a copy of file 120 all correspond to the same version of the source file.

Implementations described herein may ensure that a particular peer in a P2P network will use encoded pieces that all correspond to the same version of the source file. Implementations include use of a LMD field included with encoded pieces so that encoded pieces of source files of different time epochs can be distinguished. Thus, a particular peer can avoid mixing together encoded pieces corresponding to source files of different time epochs. The LMD may be included with each encoded piece (along with the associated encoding vector) so that when an encoded piece is sent from one peer to another peer, the LMD information may be sent along with the associated encoded piece.

The foregoing description of exemplary implementations provides illustration and description, but is not intended to be exhaustive or to limit the invention to the precise form disclosed. Modifications and variations are possible in light of the above teachings or may be acquired from practice of the invention.

For example, while implementations have been described in the context of nodes being servers and computers, other implementations may incorporate routers, switches, or other network devices. Also, while series of blocks have been described with respect to FIGS. 4, 5, and 6, the order of the blocks may be varied in other implementations. Moreover, non-dependent blocks may be implemented in parallel.

It will be apparent that various features described above may be implemented in many different forms of software, firmware, and hardware in the implementations illustrated in the figures. The actual software code or specialized control hardware used to implement the various features is not limiting of the invention. Thus, the operation and behavior of these features were described without reference to the specific software code—it being understood that one would be able to design software and control hardware to implement the various features based on the description herein.

Further, certain portions may be implemented as "logic" that performs one or more functions. This logic may include firmware, hardware, such as a processor, a microprocessor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving two or more encoded pieces of a source file at a node in a peer-to-peer network, each of the two or more encoded pieces including a last-modified-date (LMD) value;
    comparing the LMD values of each of the two or more encoded pieces;
    combining at least two of the two or more encoded pieces that have a common LMD value into a new encoded piece;
    discarding any encoded pieces that have an LMD value different than the common LMD value; and
    appending the common LMD value to the new encoded piece.

2. The method of claim 1, further comprising:
    sending the new encoded piece to another node in the peer-to-peer network.

3. The method of claim 1, where combining at least two of the two or more encoded pieces that have a common LMD value into a new encoded piece comprises:
    forming a new random linear combination of the at least two of the two or more encoded pieces; and
    supplying a new encoding vector for the new random linear combination.

4. The method of claim 3, where the common LMD value is appended to the new encoding vector.

5. A system comprising:
    a network node including:
        a memory to store a plurality of instructions; and
        a processor to execute instructions in the memory to:
            receive two or more encoded pieces of a source file, each of the two or more encoded pieces including a last-modified-date (LMD) value;
            compare the LMD values of each of the two or more encoded pieces;
            combine at least two of the two or more encoded pieces that have a common LMD value into a new encoded piece;
            discard any encoded pieces that have an LMD value different than the common LMD value; and
            append the common LMD value to the new encoded piece.

6. The system of claim 5, where the network node is further to:
    send the encoded pieces with the common LMD to another network node in a peer-to-peer network.

7. The system of claim 5, where the network node is further to identify the two or more encoded pieces from a common source file that have a common LMD value.

8. The system of claim 5, where the network node is further to:
    associate an encoding vector with each of the two or more encoded pieces, and append the common LMD value to the encoding vector.

9. The system of claim 5, where each LMD value includes a date and time value calculated using a Network Time Protocol or a Simple Network Time Protocol.

10. The system of claim 5, where the network node is further to:
    receive the two or more encoded pieces from another node, and determine which of the two or more encoded pieces are current based on LMD values associated with each of the two or more encoded pieces.

* * * * *